United States Patent [19]

Mookherjee et al.

[11] 3,728,359

[45] Apr. 17, 1973

[54] HYDROXY CYCLOHEXADECANOLIDES

[75] Inventors: Braja D. Mookherjee, Matawan; William I. Taylor, Summit, both of N.J.

[73] Assignee: International Flavors & Fragrances Inc., New York, N.Y.

[22] Filed: June 25, 1971

[21] Appl. No.: 156,980

Related U.S. Application Data

[62] Division of Ser. No. 18,684, March 11, 1970.

[52] U.S. Cl. ................................................. 260/343
[51] Int. Cl. ............................................... C07d 9/00
[58] Field of Search ....................................... 260/343

[56] References Cited

UNITED STATES PATENTS 3,573,283   3/1971   Merijan et al. ..................... 260/243

Primary Examiner—John M. Ford
Attorney—Lorimer P. Brooks et al.

[57] ABSTRACT

A mixture of hydroxy cyclohexadecanolides is obtained by oxidation of hydroxy-cyclohexadecanones in the presence of a boron-trifluoride etherate catalyst. Said hydroxy cyclohexadecanolides are useful as intermediates for the production of ambrettolide and isomers thereof.

1 Claim, No Drawings

HYDROXY CYCLOHEXADECANOLIDES

This application is a division of Ser. No. 18,684, filed on Mar. 11, 1970.

This invention relates to a process for the preparation of mocrocyclic compounds for use in the perfume industry. More specifically, the present invention relates to a process for the preparation of ambrettolide (cyclohexadecen-7-olide) and isomers thereof from 1,9-cyclohexadecadiene. Additionally, this invention relates to novel macrocyclic compounds, i.e., 1,2,9,10-diepoxycyclohexadecane, 1,9-cyclohexadecadiol, 1,8-cyclohexadecadiol, 9-hydroxy-1-cyclohexadecanone, 8-hydroxy-1-cyclohexadecanone, 9-hydroxy-1-cyclohexadecanolide. These compounds are useful intermediates in the synthesis of ambrettolide and isomers thereof.

The macrocyclic compounds, i.e., ambrettolide and isomers thereof, prepared by the process of the present invention are musk odorants and as such are highly desirable. The odor of musk is perhaps the most universally appreciated fragrance and is usually thought of as the animal note in perfumes. A number of naturally occurring species, both of animal and vegetable origin, possess musk odors; however, only three animal sources have achieved any commercial importance. It is because of the high demand and short supply of these naturally occurring musk odorants that numerous attempts have been made since the 1920's to synthesize compounds which would duplicate these desirable odors.

Ambrettolide naturally occurs in musk ambrette seed oil and is a valuable perfume base because of its desirable odor. Ruzicka and Stoll [Helv. Chem. Acta, 17, 1609 (1928)] show a method for preparing macrocyclic lactones involving the oxidation of macrocyclic ketones with Caro's acid (persulfuric acid) to the corresponding lactones. Ambrettolide is said to be prepared by this method. U.S. Pat. No. 2,417,151 discloses a process for the preparation of ambrettolide involving intramolecular esterification. In this process sodium 6,16-dihydroxypalmitate is condensed with 1-chloropropanediol-2,3 to form the glycerol monoester which is treated with sodium acid sulfate to produce a mixture of unsaturated isomeric glycerol mono-esters. This mixture is then distilled and worked up to yield a mixture of unsaturated isomeric large-ringed cyclic lactones including ambrettolide which can be separated out, if desired. Other methods for the preparation of macrocyclic lactones are also known but applicants are unaware of any prior art process in which 1,9-cyclohexadecadiene is utilized as the starting material for the preparation of ambrettolide and isomers thereof.

It is, therefore, an object of the present invention to provide a novel process for the preparation of ambrettolide and isomers thereof.

It is a further object of the present invention to provide a process for the preparation of ambrettolide and isomers thereof from 1,9-cyclohexadecadiene.

It is a still further object of the present invention to provide novel macrocyclic compounds.

Other objects of the present invention will be set forth in, or be readily apparent from the following detailed description of the invention.

THE INVENTION

These objects are achieved by the process of the present invention which comprises the steps of:

1. epoxidizing 1,9-cyclohexadecadiene of the structure

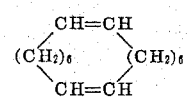

to form a diepoxidized cyclohexadecane of the structure

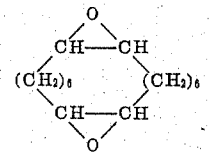

and 2. reducing said diepoxidized cyclohexadecane to form a mixture of cyclohexadecadiols of the structures

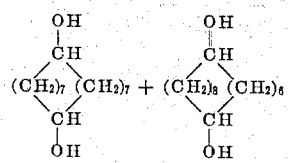

and 3. oxidizing said cyclohexadecadiols to form the corresponding hydroxy ketones of the structures

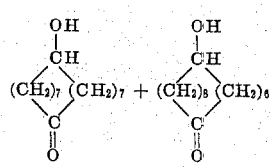

and 4. treating said hydroxy ketones with a peracid in the presence of a boron trifluoride etherate catalyst to form a mixture of hydroxy cyclohexadecanolides of the structures

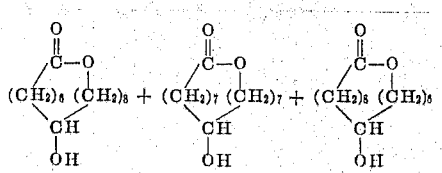

and 5. dehydrating said hydroxy cyclohexadecanolides to obtain the desired mixture of ambrettolide and isomers thereof of the general structure

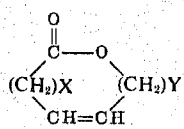

wherein $x$ is 5, 6, 7 and 8 and $y$ is 8, 7, 6 and 5, respectively and $x$ plus $y$ equals 13; said mixture can be separated by conventional means, if desired, into the various isomers, e.g., when $x$ is 5 and $y$ is 8 the lactone is ambrettolide and when $x$ is 7 and $y$ is 6 the lactone is iso-ambrettolide.

The 1,9-cyclohexadecadiene utilized as the starting material in the process of the present invention may be prepared by dimerizing cyclooctene as more fully disclosed in U.S. Pat. No. 3,439,056, granted on Apr. 15, 1969.

The first step of the process of the present invention comprises treating 1,9-cyclohexadecadiene with an excess of an oxidizing agent such as a peracid, for example, peracetic acid, perpropionic acid, perbenzoic acid, perphthalic acid or other suitable peracid, in the presence of an alkali metal carboxylate such as sodium acetate and in a suitable reaction medium at a reduced temperature. Suitable reaction media include methylene chloride, chloroform, carbon-tetrachloride, and the like. Usually, a reduced temperature of from about −5°C to about 10°C is used although a temperature of from 0°C to about 5°C is preferred. The peracid oxidizing agent is utilized in excess and preferably in a molar ratio of peracid oxidizing agent to 1,9-cyclohexadecadiene of at least 4:1 to insure completion of the reaction. The 1,2,9,10-diepoxycyclohexadecane may be separated and recovered by conventional techniques including evaporation, distillation, solvent extraction and the like.

The second step of the process comprises treating 1,2,9,10-diepoxycyclohexadecane with an excess of a reducing agent such as lithium aluminum hydride or hydrogen (in the presence of platinum or palladium) in a solvent such as ether, methanol, or the like. The reducing agent is utilized in a molar ratio of reducing agent to 1,2,9,10-diepoxycyclohexadecane of at least about 4:1 to insure a complete reduction of the diepoxide. The temperature of the reaction is preferably room temperature and the reaction is usually completed within four hours and the reaction mixture is then treated with cold water to decompose the complex formed. The mixture of 1,9- and 1,8-cyclohexadecadiols may be recovered by conventional means.

The third step of the process involves oxidizing the 1,9- and 1,8-cyclohexadecadiols to the corresponding hydroxy ketones with a suitable oxidizing agent such as chromic acid. This is generally accomplished in the presence of a strong mineral acid such as sulfuric acid in a liquid medium such as acetone. The oxidizing agent is utilized in a molar ratio of oxidizing agent to cyclohexadecadiol of 1:1 to insure formation of the desired hydroxy ketone. The reaction temperature is maintained at 5°C or less and preferably is at 0°C. The mixture of 9-hydroxy-1-cyclohexadecanone and 8-hydroxy-1-cyclohexadecanone obtained is recovered by conventional techniques including aqueous extraction, evaporation and distillation.

The fourth step of the process comprises treating the mixture of 9-hydroxy-1-cyclohexadecanone and 8-hydroxy-1-cyclohexadecanone with a peracid oxidizing agent such as peracetic acid, perpropionic acid, perbenzoic acid, perphthalic acid or other suitable peracid in the presence of a boron trifluoride etherate catalyst and in a suitable reaction medium such as chloroform. The peracid oxidizing agent is utilized in excess and preferably in a molar ratio of peracid to hydroxy cyclohexadecanone of at least 3:1, preferably about 4:1, to insure completion of the reaction. The reaction temperature may vary from about 40°C to about 70°C although preferably it is within the range of about 45°C to about 55°C. The mixture of hydroxy cyclohexadecanolides may be recovered in any conventional manner. This step is more fully disclosed in the copending application, Mookherjee and Taylor, PROCESS FOR THE PREPARATION OF MACROCYCLIC LACTONES, Ser. No. 18,701, filed Mar. 11, 1970 which is incorporated by reference herein.

The fifth step of the process comprises dehydrating the hydroxy cyclohexadecanolides to form ambrettolide and isomers thereof. This is conveniently performed with a strong acid catalyst such as p-toluenesulfonic acid, sulfuric acid and the like and is accomplished in the liquid phase using an anhydrous solvent such as anhydrous benzene. Temperatures of from about 100°C to about 350°C, preferably about 310°C, are necessary to effect the reaction. A mixture of ambrettolide and isomers thereof, is recovered by conventional means and can be separated, if desired. Separation of the mixture yields a variety of isomers including ambrettolide and iso-ambrettolide.

The mixture of isomers, as well as ambrettolide (cyclohexadecen-7-olide) and the other isomers individually, prepared by the process of the present invention, have a highly desirable and useful odor characterized as a musk odor and usually thought of as the animal note in perfumes. They can be utilized as a component of perfume compositions to promote musk fragrances. Perfume compositions containing from about 1.0 percent to about 50.0 percent of these musk odorants by weight based on the active fragrance ingredients before dilution are desirable and useful.

The following examples will illustrate in detail the manner in which the invention may be practiced. It will be understood, however, that the invention is not confined to the specific limitations set forth in the individual examples but rather to the scope of the appended claims.

EXAMPLE I

Preparation of Ambrettolide and Isomers Thereof

A. Preparation of 1,2,9,10-diepoxycyclohexadecane from 1,9-cyclohexadecadiene

An apparatus consisting of a 100 ml reaction flask fitted with a thermometer, mechanical stirrer, addition funnel and ice bath is charged with 5.0 g (0.023 mole) of 1,9-cyclohexadecadiene, 7.0 g of sodium acetate and 30 ml of methylene chloride and cooled to 0°C. A solution containing 9.4 g (0.046 mole) 40 percent peracetic acid and 20 ml of methylene chloride is prepared and is then added slowly to the flask during a ½ hour period while the temperature is maintained at 0°C. The mixture is then stirred for 3 hours at 0°–5°C and then is permitted to return to room temperature. The mixture is then poured into a separatory funnel containing 40 ml of water. The aqueous layer is extracted three times with 30 ml portions of methylene chloride. The combined organic layer is then washed with a saturated sodium chloride solution until it tests neutral and then is dried over anhydrous sodium sulfate. The solvent is removed by means of a rotary evaporator yielding 6.16 g of crude material which is then chromatographed to obtain 5.15 g (90 percent yield) of 1,2,9,10-diepoxycyclohexadecane.

B. Preparation of a mixture of 1,9- and 1,8-cyclohexadecadiols from 1,2,9,10-diepoxycyclohexadecane An apparatus consisting of a 1 l. reaction flask fitted with an addition funnel, thermometer, mechanical stirrer, condenser, heating mantle and nitrogen purge is charged with 12.14 g (0.32 mole) of lithium aluminum hydride and 300 ml of anhydrous ether. A solution containing 20.0 g (0.079 mole) of 1,2,9,10-diepoxy-cyclohexadecane and 200 ml of anhydrous ether is then added slowly over a one hour period. After the addition is completed the mixture is refluxed for 4 hours and then cooled down to 4°C. The reaction mixture is then decomposed with 40 ml of cold water and the lithium hydroxide salt is extracted and washed with carbon tetrachloride until neutral and the ether extract is washed three times with 50 ml portions of a 50 percent sodium chloride solution until neutral. The solvent is then removed yielding 15.6 g of a crude cyclohexadecadiol mixture.

C. Preparation of a mixture of 9-hydroxy-1-cyclohexadecanone and 8-hydroxy-1-cyclohexadecanone from 1,9- and 1,8-cyclohexadecadiols An apparatus consisting of a 1 l. reaction flask fitted with an addition funnel, reflux condenser, thermometer, mechanical stirrer and dry ice bath is charged with 14.0 g (0.956 mole) of a mixture of 1,9- and 1,8-cyclohexadecadiol and 550 ml of acetone and cooled to 0°C. A solution containing 5.6 g (0.056 mole) of chromic oxide, 4.2 g of concentrated sulfuric acid and 28 ml of water is prepared and added dropwise over a 2 hour period. After the addition is completed the reaction mixture is stirred for 1 hour at 0°C and then the acetone is removed by vacuum and replaced with 400 ml of water. The aqueous solution is then transferred to a separatory funnel and saturated with sodium chloride and then extracted five times with 100 ml portions of carbon tetrachloride. It is then washed three times with a 50 percent sodium chloride solution until neutral and then dried over sodium sulfate yielding 12.6 g of crude material. This crude material is then chromatographed to obtain 5.2 g (41 percent yield) of hydroxy cyclohexadecanones.

D. Preparation of a mixture of 9-hydroxy-1-cyclohexadecanolide, 8-hydroxy-1-cyclohexadecanolide and 10-hydroxy-1-cyclohexadecanolide from 9-hydroxy-1-cyclohexadecanone and 8-hydroxy-1-cyclohexadecanone An apparatus consisting of a 100 ml reaction flask fitted with an addition funnel, mechanical stirrer, thermometer, reflux condenser, heating mantle and thermo watch is charged with 2.0 g (0.0078 mole) of a mixture of hydroxy cyclohexadecanones, 40 ml of chloroform and 0.6 g of boron trifluoride etherate and the mixture is stirred. Over a 15 minute period, 5 g (0.028 mole) of 40 percent peracetic acid is added and the resulting reaction mixture is then stirred for 12 hours at 50°C ± 5°C and then for 24 hours at room temperature. The chloroform layer is then washed three times with 20 ml portions of a 50 percent sodium chloride solution and twice with cold water until neutral and then dried over sodium sulfate yielding 2.0 g of crude material. This crude material is then chromatographed to obtain 0.35 g (30 percent yield) of hydroxy cyclohexadecanolides.

E. Preparation of ambrettolide from hydroxy cyclohexadecanolides

An apparatus consisting of a 15 ml receiver fitted with an addition funnel, glass stopper and magnetic stirrer is charged with 100 mg of a mixture of hydroxy cyclohexadecanolides, 1 ml of anhydrous benzene and 30 mg of p-toluene sulfonic acid and the mixture is stirred for one hour at room temperature. The reaction mixture is then injected into a pyrolytic glass column packed with 5 g of Anakrom coated with 10 percent silicone rubber (SE 30 Gum Rubber) and 1 g stainless steel turnings at a temperature of 310°C and the distillate is collected in a cooled vial, and purged of the solvent leaving 50 mg of a mixture of ambrettolide and isomers thereof. This mixture is separated by gas-liquid chromatography using helium as the gas and a 25 foot, ¼ inch inside diameter stainless steel column at 100°C and with a flow rate of 80 ml per minute and packed with 5 percent polyethylene glycol (carbowax 20M) supported on Anakrom ABS (a trademark of the Analab Corporation, North Haven, Conn. covering a treated diatomaceous earth composition). The analysis shows the presence of ambrettolide as well as the other isomers.

EXAMPLE II

A perfume composition is prepared by admixing the following ingredients in the indicated proportions:

| Ingredient | Parts |
|---|---|
| Geranium, Algerian | 100 |
| Clove | 100 |
| Cassin | 30 |
| Labdanum resin | 60 |
| Castoreum absolute | 10 |
| Sandal | 50 |
| Cedarwood | 150 |
| Ionone residues | 30 |
| Vetivert | 20 |
| Benzyl benzoate | 150 |
| Terpineol | 150 |
| Ambrettolide from Example I | 150 |
| | 1000 |

This perfume composition is found to have a desirable musk fragrance quality.

EXAMPLE III

A total of 100 g of soap chips is mixed with 1 g of the perfume composition prepared in Example II until a substantially homogeneous composition is obtained. This homogeneous mixture is pressed into a bar having a desirable musk scent.

What we claim is:

1. A mixture of 9-hydroxy-1-cyclohexadecanolide, 8-hydroxy-1-cyclohexadecanolide, and 10-hydroxy-1-cyclohexadecanolide.

* * * * *